Feb. 10, 1970 P. V. MALLOY 3,494,633
PASSENGER SAFETY DEVICE FOR VEHICLE
Filed Jan. 17, 1968 3 Sheets-Sheet 1

INVENTOR.
PAUL V. MALLOY
BY
ATTORNEYS

INVENTOR.
PAUL V. MALLOY
BY
ATTORNEYS

INVENTOR.
PAUL V. MALLOY
BY
ATTORNEYS

United States Patent Office 3,494,633
Patented Feb. 10, 1970

3,494,633
PASSENGER SAFETY DEVICE FOR VEHICLE
Paul V. Malloy, 1562 Marlowe Ave.,
Lakewood, Ohio 44107
Filed Jan. 17, 1968, Ser. No. 702,158
Int. Cl. B60r 21/10
U.S. Cl. 280—150                  19 Claims

ABSTRACT OF THE DISCLOSURE

A generally rectangular restraining member or members for occupants of the front and/or rear seats of an automobile engageable with the automobile adjacent to the cowl and/or the rear seat, preferably pivotally attached to a support structure on the cowl of the automobile and/or on the rear of the front seat so as to permit the member or members to be swung to a raised position to permit ingress and egress of the front seat occupants or swung to a lowered position in which the member extends across the midsections of occupant or occupants of the seat and/or seats to restrain movement of the occupant or occupants forwardly relative to the seat. Preferably body engaging harness strips art attached at one end to the restraining member or members and at their other end to automatic strap take-up mechanism such that the straps are extended across the shoulders and downwardly along the trunks of the occupants of the seat when the restraining member is lowered, thereby providing additional restraint to the forward movement of the occupants. The restraining member or members may be secured in the lowered position by yieldable holddown elements attached to some suitable part of the vehicle such as the floor, door, seat, etc. When the front seat restraining member is in its raised position, a projection on the member may engage the steering wheel to prevent operation of the wheel while the member is in its non-restraining position. The restraining member or members and/or their connection with the automobile are constructed to yield under extreme forward thrusting on the member or members and eventually break the windshield from its mounting and raise a web-like barrier across the windshield opening and/or in front of the rear seat to provide a further barrier to occupants tending to be thrown forward from their seats. The construction is such as to provide a progressive deceleration and absorption of the kinetic energy of the occupant or occupants in the event of a collision or the like.

FIELD OF THE INVENTION

The present invention relates to safety devices for restraining the occupant or occupants of an automobile and like vehicles from being thrown from their seats and from the automobile in the event of sudden deceleration of the vehicle.

An object of the invention is the provision of a new and improved safety device for restraining an occupant or occupants in an automobile from being thrown forwardly from their seats in the event of a sudden deceleration and which device comprises a generally rectangular frame-like structure having one side extending across the front of an occupant or occupants of the front seat of the automobile and the other side supported on the cowl of the automobile adjacent the windshield and/or a second generally rectangular frame-like structure having one side extending across the front of an occupant or occupants of the rear seat of the automobile and the other side supported on the back of the front seat.

Another object of the invention is the provision of a new and improved safety device or devices of the character referred to for an occupant or occupants of an automotive vehicle or the like which restrains the occupant or occupants from being thrown forwardly from the seat or seats as a result of sudden deceleration of the vehicle and which preferably yields to the inertial forces exerted by the occupant or occupants so as to gradually absorb these forces with a minimum of injury to the occupant or occupants and which, if desired, establishes a secondary, preferably web-like barrier forwardly of the occupant or occupants when subjected to extreme inertial forces resulting from a maximum or a catastrophic deceleration.

Another object of the invention is the provision of a new and improved occupant safety device of the character mentioned for automobiles and similar vehicles in which the front seat device displaces the windshield of the automobile in response to a maximum deceleration and establishes a second occupant restraining barrier across the windshield opening.

Still another object of the invention is the provision of a new and improved safety device or devices of the character referred to having the characteristics mentioned and which can be conveniently and readily manipulated by a single occupant of a seat from an ineffective position to a position in which it is operative to restrain all of the occupants of the seat of the vehicle.

A further object of the invention is the provision of a new and improved safety device for automobiles and of the character referred to and in which the occupant restraining means comprises a restraining bar supported across the front seat of the automobile by arms attached to a support structure on the cowl of the automobile and which structure is actuated by shifting of the arms to erect a secondary barrier, such as a flexible web-like wall across the vehicle body forwardly of the occupants when the force of the occupants against the bar is relatively extreme.

A more specific object of the invention is the provision of a new and improved safety device for an automobile having an occupant compartment including a seat and two forward corner posts and a windshield supported therebetween forwardly of the seat, the device comprising a restraining bar adapted to extend transversely of the compartment and which is supported on the ends of a plurality of arms attached to a base structure between the corner posts, which arms extend rearwardly so that the bar can be shifted to and from a position to restrain forward movement of occupants from the seat, the support structure being connected to the corner posts by members extended about the rearward sides of the corner posts, the members being yieldable under extreme forwardly directed forces on the restraining bar to permit movement of the base structure.

A still further object of the invention is the provision of a safety device of the character referred to an occupant or occupants in an automotive or other vehicle which comprises an elongated restraining element supported by arms which permit movement of the restraining element from a position to be engaged by persons occupying the seat to a position removed from the occupants, and which arms control a member which interengages with the steering apparatus of the vehicle to prevent guiding of the vehicle when the restraining element is in a position which is ineffective to restrain the occupants.

Yet another object of the invention is the provision of a new and improved safety device for occupants of automotive vehicles which comprises an occupant body restraining bar supported so as to be movable from a raised position forwardly of occupants of a seat of the vehicle to a lowered position in which the bar extends across the seated occupants and in proximity to the midsections thereof, and which device includes a strap-type harness attached at one end to the bar and to a support on the vehicle rearwardly of occupants on the seat to restrain movement of the upper portions of the occupants forwardly of the seat and which harness is applied to and removed from restraining relationship with the occupants merely by movement of the bar to its lowered and raised positions respectively.

A still further object of the invention is the provision of a new and improved safety device for automotive vehicles which comprises a restraining bar and support structure therefor which can be shifted to and from a position to restrain one or more occupants on the front seat of the vehicle and which structure includes steering means supported thereon and connected with the steering apparatus of the vehicle so that the steering means is carried on the support structure and moves therewith as the restraining bar is shifted whereby the usual steering post and its hazard to occupants of the vehicle during a collision or other sudden deceleration of the vehicle is eliminated.

Another important object of the invention is the provision of a safety device of the character referred to which may be readily installed on vehicles as original equipment or added to existing vehicles.

Other objects and advantages of the present invention will become apparent from a consideration of the following detailed description of preferred embodiments thereof made with reference to the accompanying drawings which form a part of the specification and wherein.

Figure 1:
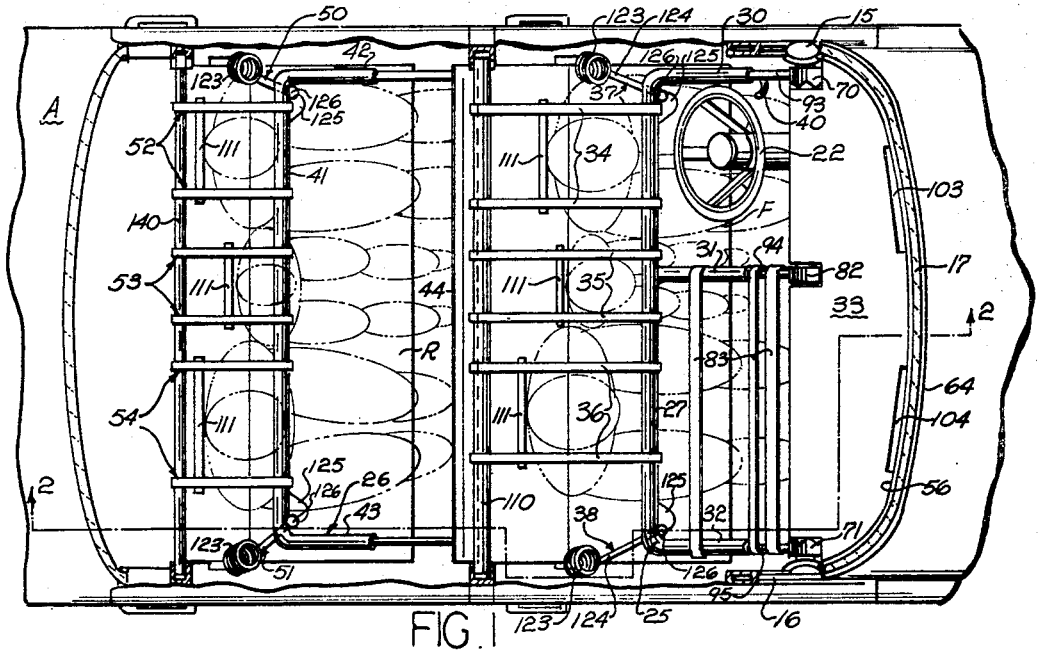
FIG. 1 is a fragmentary schematic plan view, with parts broken away, of an automobile type personal vehicle equipped with safety devices embodying the invention.

Referring to FIGS. 1 to 8, a two seat sedan type passenger automobile A is shown which includes front and rear seats F, R, enclosed in a passenger compartment which comprises a top T, front corner posts 15, 16 between which a windshield 17 is located and which closes the forward end of the compartment. The automobile A includes a cowl 20, a dashboard 21, and a steering wheel and post structure 22 which extends upwardly and rearwardly into the compartment. The automobile A and its components mentioned are of well known construction and is shown more or less schematically for sake of clarity.

Passengers occupying the front seat F are restrained from being thrown forwardly from their seat, as is likely to occur upon a sudden deceleration of the automobile due to braking or a collision, by a safety device 25, and passengers occupying the rear seat R are restrained from being thrown forwardly under like circumstances by a safety device 26.

Figure 2:
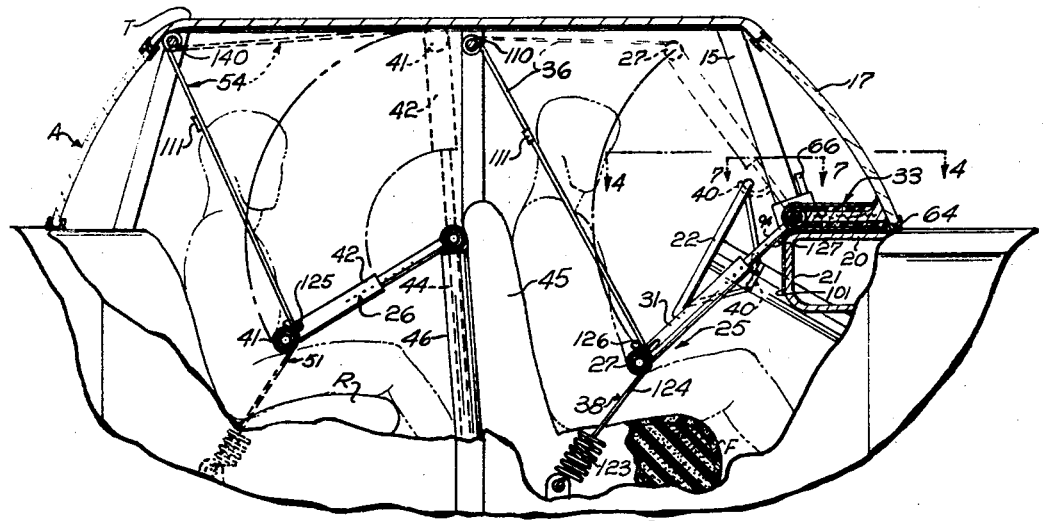
FIG. 2 is a fragmentary schematic side view, with parts broken away, of the vehicle shown in FIG. 1.
Figure 7:
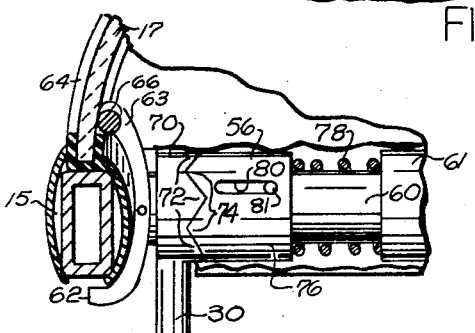
FIG. 7 is a fragmentary sectional view taken substantially along line 7—7 of FIG. 2.

Referring generally to the device 25, an elongated restraining element or bar 27 is supported to extend transversely of the passenger compartment by three rigid arms 30, 31, 32, which are pivoted to a base structure 33 located on the top of the cowl 20. The arms 30, 31, 32 permit the bar 27 to be swung to an overhead or ineffective position, seen in broken lines in FIG. 2, or to a lowered passenger restraining or operative position seen in full lines. Detent means described more fully hereinafter yieldingly retain the bar 27 in its overhead position shown in phantom in FIG. 2. When in the overhead position, the bar 27 permits passengers to freely enter or leave the front seat area of the passenger compartment and when the bar is in its lowered position it extends parallel to the seat F and in a position to engage or to be engaged by the mid-section of the occupants of the seat, as is indicated in FIGS. 1, 2 thereby resisting movement of the occupants forwardly from their seat. Body harnesses 34, 35, 36 are attached to the bar 27 and to the top of the compartment so that the harnesses are applied across the shoulders and the trunks of the occupants of the front seat when the bar is lowered to its operative position. The bar 27 is held in its lowered position by hold-down straps 37, 38.

The bar 27 and the harnesses 34, 35, 36 provide adequate restraint to forward movements of the seat occupants during moderately sudden decelerations. In the event of a severe deceleration, such as occurs as a result of a collision, the initial force exerted by the vehicle occupants on the bar 27 and harnesses 34, 35, 36 is apt to be such that some yielding of these restraints is desirable for limiting forces imposed on the occupants' bodies and thereby prevent serious injuries. In such circumstances, the arms 30, 31, 32 may be moved forwardly by the inertial forces of the persons against the bar 27 as the harness 34, 35, 36 and the hold-down straps 37, 38 yield. This movement of the arms 30, 31, 32 causes the base 33 to be tilted upwardly and forwardly, if the force on the bar is sufficient and displace the windshield 17 and erect a web-like curtain or barrier, described more fully hereinafter, across the windshield opening to block passengers from being catipulted through the opening.

To assure usage of the safety device, means are provided for blocking operation of the steering wheel when the bar 27 is in its raised or ineffective position. In the form of invention shown, arm 30 has an extension thereon, the end of which is curved to engage the rim of the steering wheel and prevent steering of the automobile while the bar 27 is in its raised or ineffective position, as seen in broken lines in FIG. 2.

The safety device 26 for passengers occupying the rear seat R comprises a restraining bar 41 which is swingingly supported on a pair of rigid arms 42, 43, pivotally attached to a frame 44 on the rear side of the backrest 45 for the front seat F. The frame 44 is of a flat, rectangular configuration and is supported for vertical movement by a pocket structure 46 formed in the covering for the backrest 45, and a web-like barrier 47 is secured to the sides of the frame and presents a barrier extending transversely of the compartment above the backrest when the frame is elevated, as is described more fully hereinafter. The bar 41 is yieldingly held in its lowered position by hold-down straps 50, 51 attached to the floor. Detent means, described hereinafter, yieldingly hold the bar 41 in an elevated position to permit passengers to freely enter or leave the rear seat area.

In addition to the bar 41, the passengers on the rear seat R are restrained from forward movement from the seat by body harnesses 52, 53, 54 attached to the bar and to the top of the compartment to the rear of the passengers and which are applied to restrain the passengers in the same manner as the harnesses 34, 35, 36 of the device 25. The harnesses 52, 53, 54 and the bar 41 are effective to prevent passengers on the rear seat from being thrown forwardly from the seat during relatively mild deceleration of the automobile. In the event of an extremely sudden deceleration, the harnesses 52, 53, 54 and the holddown straps 50, 51 yield as extreme pressure is applied to the bar 41 by the inertial force of the passengers and the bar is forced forwardly, causing the arms 42, 43 to assume a more nearly upright position which raises the frame 44 and positions the barrier 47 across the space above the backrest 45. Thus, the barrier 47 blocks movement of the passenger or passengers into the front of the compartment.

Referring more specifically to the safety device 25, the base structure 33, to which the arms 30, 31, 32 are pivoted, comprises a board like panel 55, the forward edge 56 of which is curved to coincide with the curvature of the bottom edge of the windshield 17, and the rear edge of the panel is straight and extends across the cowl 20 adjacent the rear edge thereof. A stationary shaft or post 60 which pivotally supports the arms 30, 31, 32 is secured to the rear edge of the panel 55 by two metal straps 61 which are bolted or riveted to the panel. The base 33 is secured between the corner posts 15, 16 by two curved clamp members 62, 63 attached to each end of the shaft 60.

The members 62, 63 at each end of the shaft 60 present fork-like elements which extend partially around the respective corner posts 15, 16 and are particularly effective in resisting forward movement of the base 33 as passengers press against the bar 27. The members 62, however, are formed of ductile metal which yields under sufficient pressure, to straighten the member and permit the sides of the base 33 to pass forwardly and upwardly between the corner posts 15, 16. The clamp members 62 are designed to yield or straighten only when sufficient force is applied by inertial forces occurring during a collision or the like in which the deceleration of the automobile is so sudden that the passengers in the front seat would be catipulted against or through the windshield 17 if it were not for the restraining bar 27. This yielding of the members 62 permits the base 33 to be raised and tilted forwardly by the force on the arms 30, 31, 32 and if the force is great enough, to dislodge the entire windshield and its frame from the opening across the front of the passenger compartment so that it will not present a hazard to the passengers thrown forwardly.

To facilitate dislodgement of the windshield 17 by the base 33 under the circumstances just described, the forward edge 56 of the base may have a wedge-like surface which extends upwardly from the bottom ledge of the windshield and across the windshield so as to pry the lower ledge of the windshield forwardly when the base 33 is tilted as described. This action assists in dislodging the frame 64 of the windshield from its position on the cowl 20. The clamp members 63 may also each have an upwardly extending portion 66 which lies along the adjacent side of the windshield 17 for applying a prying force to the side sections of the windshield when the base 33 is tilted forwardly.

The arms 30, 31, 32 and the bar 27 carried thereby are adapted to be yieldingly held in their raised positions and in their lowered positions by detent means so that the arms position the restraining bar in either its ineffective or in its passenger restraining positions. By this arrangement the bar can be readily shifted from one position to the other by a person on the seat F. For this purpose, the arms 30 32 have hubs 70, 71 which are rotatably supported on the end portions of the shaft 60 and the inner radial faces of these hubs have tapered projections or teeth 72, 73 which mesh with tapered teeth of slots 74, 75 on the outer end faces of collars 76, 77 slidingly supported on the shaft. The collars 76, 77 are urged against the hubs 71, 72 by coil springs 78 disposed between the inner ends of the two collars and the straps 61. The collars 76, 77 each has a slot 80 therein into which a pin 81 on the shaft 60 projects to prevent rotation of the collar on the shaft while permitting axial movements of the collars. It will be apparent that the force of the collars 76, 77 against the hubs 70, 71 tends to cause the other of the two slots 74, 75 in the collars 76, 77 and rotation of the bar 27 into one or the other of its two positions when the bar 27 is between or adjacent to its raised and lowered positions. The teeth 72, 73 are located relative to the arms 30, 32 and the slots 74, 75 in the collars 76, 77 so that the two positions of the bar 27 mentioned are those shown in broken and full lines in FIG. 2.

The intermediate arm 31 has a hub 82 which is rotatably supported on the shaft 60 and is free to move according to movements of the arms 30, 32.

Preferably, suitable flexible restraining bands 83 are laced between the arms 31, 32 to provide a yieldable barrier which restrains the passengers' heads from being thrown downwardly into the forward part of the compartment and/or against the dashboard 21.

To enable the device 25 to be conveniently installed on the cowl 20 of the automobile A, the shaft 60 is constructed to be extended and retracted so as to permit the base 33, with the shaft 60 retracted, to be placed on the cowl 20 and between the posts 15, 16 whereupon the shaft is extended to cause the clamping members 62, 63 thereon to firmly engage the corner posts. For this purpose, the shaft 60 is formed by two aligned sections, the inner ends of which are threaded at 84, 85. The pitch of the threads of the sections 84, 85 are reversed relative to one another and are threaded into a connecting sleeve 86, which when rotated in one direction or the other causes elongation or contraction of the shaft as the two sections of the shaft are moved by the threads in the sleeve.

The length of the restraining bar 27 may be adjusted by forming the bar of two tubular sections 90, 91 joined by a rod or tube 92 telescoped into the two tubular sections and secured therein by removable fasteners, the details of which are not shown as such expedients are well known.

In the form of the invention shown, the arms 30, 31, 32 are formed of two sections, one section being integral with the bar 27 and which telescopingly receive shanks 93, 94, 95, attached to the hubs 70, 82, 71 respectively. The shanks 93, 94, 95 are adjustably secured in the respective tubular section of the arms 30, 31, 32 at locations to properly position the bar 27 relative to the seat F.

Preferably, suitable padding 96 is applied to the panel 55 of the base 33 and this padding is covered by a tough flexible fabric or webbing 100 which has an extended portion 101 folded beneath the panel and the outer end of which is suitably secured to the cowls 20 and/or the dashboard 21. The fabric 100 forms a barrier or curtain across the windshield opening when the base 33 is elevated to the position shown in FIG. 3, thereby providing a barrier to persons tending to be catipulted through the windshield opening. The covering or web 100 is cut out at areas about the hubs 70, 82, 71 to accommodate swinging movements of the arms 30, 31, 32. The forward edge of the base 33 is also cut away at 103, 104 to provide openings registering with the windshield defroster air duct outlets in the cowl 20 and adjacent the inside of the windshield 17.

The body harnesses 34, 35, 36 are comprised of pairs of straps having one end section fixedly attached to and wound on a take-up roller 110 which is suitably attached to the upper part of the compartment and rearwardly of the front seat F. The roller 110 is adapted to be spring wound in one direction to tend to wind the straps of the harnesses 34, 35, 36 onto the roller. When the bar 27 is in its lower position, the harnesses are entirely unwound from the take-up roller 110 and the passengers are restrained from being thrown from the seat. The roller winding mechanism is not shown as such are well known and may be similar to but sturdier than that of a roller blind, for example. The opposite ends of the individual harness straps are secured to the bar 27 at intervals so that a pair of the straps overlie the shoulders of each one of the passengers seated side by side when the bar is lowered to its passenger restraining position, as is illustrated by the phantom showing of passengers in FIGS. 1 and 2. Preferably, each pair of harness straps are interconnected by a head support strap 111 which is positioned to extend across the back of the passenger's head to support the head and prevent whiplashes in the event of a rearend collision. When the bar 27 is raised to its upper position to permit passengers to enter and leave the seat F, the harnesses 34, 35, 36 are raised to the top of the compartment and the roller 110 maintains the harness straps taut so that they do not interfer with the entrance and exit of persons from the automobile.

It will be seen that the bar 27 and the harness straps 34, 35, 36 are applied to and removed from all of the occupants of the front seat merely by lowering the bar 27. Furthermore it is obvious that one person, such as the driver, can manipulate the safety device to establish protection for all passengers on the seat and because the extension 40 of arm 30 interferes with the steering wheel when the bar 27 is raised, the driver must lower the bar before the automobile can be driven.

It should be noted that the construction of the safety device 25 is such that the operability of the interlock with the steering wheel can be determined by a simple and quick inspection. Thus, any public regulation requiring use of restraining devices of the type involved could easily be policed.

Figure 3:
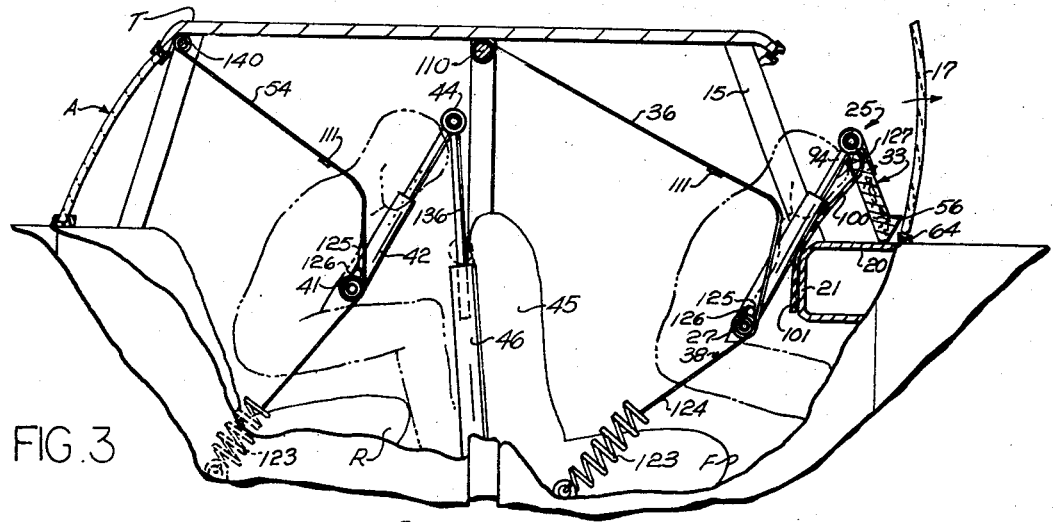
FIG. 3 is a view similar to FIG. 2 showing parts of the safety devices in positions assumed during a severe deceleration.
Figure 4:
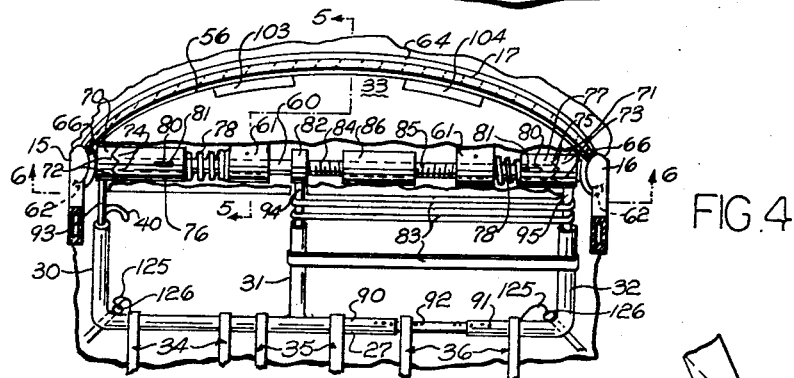
FIG. 4 is a fragmentary sectional view taken substantially along line 4—4 of FIG. 2.
Figure 5:
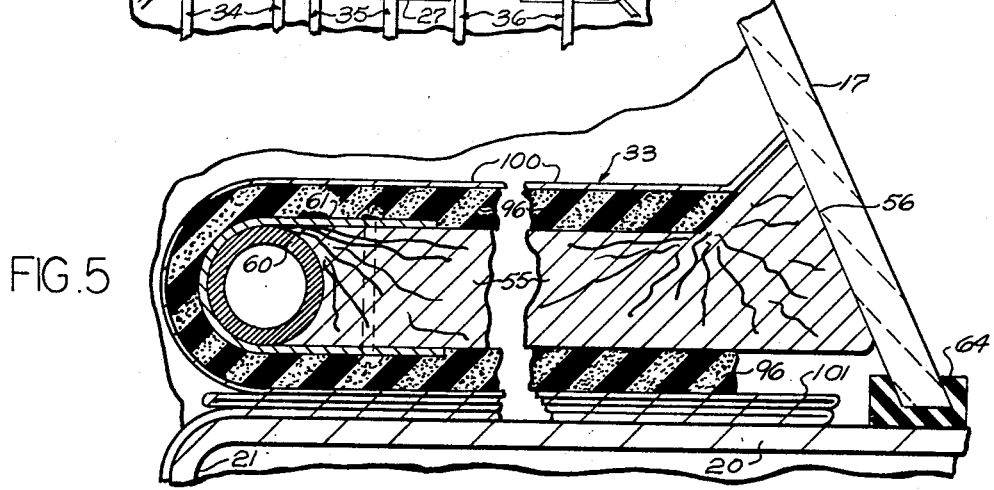
FIG. 5 is a fragmentary sectional view taken substantially along line 5—5 of FIG. 4.
Figure 6:
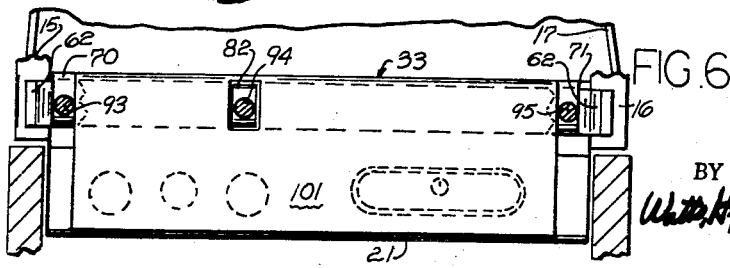
FIG. 6 is a fragmentary view taken substantially along line 6—6 of FIG. 4.

The hold-down straps 37, 38 each includes a coiled spring 123, one end of which is attached at the floor of the compartment, and a flexible strap 124 which is attached at one end to the other end of the spring. The other end of the strap 124 is adapted to be detachably connected to the bar 27 as by being caught in notches at the ends of the bar 27 formed between the juncture of the legs 30, 32 with the bar and projections 125 formed on the bar. One or more buttons or knobs 126 on the straps 124 catch on the sides of the notches to secure the straps to the bar 27. The springs 123 are preferably made of relatively ductile metal and do not retract appreciably. In the event of a sudden deceleration which causes the inertia of the passengers to force the bar 27 forwardly, as seen in FIG. 3, the springs yield to absorb and do not retract, and thereby dissipate considerable of the inertial force of the passengers without adverse effects on the passengers.

When the bar 27 is forced forwardly as just described, the lower ends of the arms 30, 31, 32 are forced forwardly causing the arms to bear on the edge of the cowl 20 and to be forced upwardly. Forceful upward movement of the arms 30, 31, 32 causes clamp members 62 at the sides of the base 33 to be deflected and straightened so that the base is moved upwardly and forwardly from between the corner posts 15, 16. This tilting movement of the base 33 raises the webbing 100 across the opening between the corner posts and at the same time presses against it and if the force is great enough, dislodges the windshield 17 so that the windshield will be thrown forwardly of its normal location and will not present a dangerous obstruction to be struck by the heads of persons thrown forwardly. The webbing 100 will then serve as a force absorbing barrier which spreads the impact area of any person thrown into the windshield opening, thereby minimizing injury. To insure movement of the arms 30, 31, 32 to a more or less upright position, cam-like formations 127 are provided on the under sides of the arms and slightly to the rear of the cowl for engaging the cowl and upon their forward movement assisting in forcing the arms towards an upright position.

By selecting the proper dimensions and material forming the clamp members 62 of the base 33 and the resistances offered by the harnesses 34, 35, 36 and the hold-down straps 37, 38 considerable inertial forces of the passengers may be dissipated harmlessly during collisions or sudden braking of the automobile, thereby protecting the passengers against impact injuries.

The passengers in the rear seat R are protected by the safety device 26 which operates similarly to the device 25. As mentioned previously, the device 26 comprises a transverse bar 41 which is supported at its ends by arms 42, 43 pivotally attached to a flat rectangular support frame 44. The support frame 44 includes a U-shaped frame member 134 formed of bent tubing, for example, having uprights 135, 136 interconnected by a transverse shaft 137 atached to the upper ends of the uprights. The arms 42, 43 are pivoted on the shaft 137 by means similar to those by which the arms 30, 31, 32 of the device 25 are pivoted to the shaft 60. These means include the detent arrangement for causing the arms to be yieldingly urged to and held in a raised position, indicated in broken lines in FIG. 2, and to a lowered position indicated in full lines.

The frame 44 is supported in an upright position along the rear of the backrest 45 of the front seat F by the pocket 46 which is suitably secured to the backrest. The pocket 46 retains the frame 44 vertically and cooperates with the backrest 45 to guide the frame for vertical movement.

The webbing 47, which is shown as a rectangular net, is attached at its edges to the frame and forms a barrier or curtain adapted to extend transversely of the passenger compartment and above the backrest 45 when the frame is moved vertically and above the backrest, as described hereinafter.

The body harness assemblies 52, 53, 54 are attached to the bar 41 and to a take-up roller 140 secured to the top of the passenger compartment rearwardly of the seat R so that the harnesses engage the shoulders and torsos of passengers in the rear seat when the bar 41 is lowered to the operative position shown in full lines in FIGS. 1 and 2. The body harnesses 52, 53, 54 are like harness 34, 35, 36 and the roller 140 is adapted to be rotated by spring mechanism in the same manner as that described with reference to the take-up roller 110.

The bar 41 is adapted to be held in its lowered position by the hold-down straps 50, 51 which are like the hold-down straps 37, 38 described with reference to bar 27 of the device 25 and may be attached to the bar in the same manner. In the lowered position, the arms 42, 43 extend upwardly at an angle of approximately 45° from horizontal, as may be seen in full lines in FIG. 2.

As mentioned previously, the device 26 is operative to restrain passengers on the rear seat R from being thrown forwardly in case of a sudden deceleration in a manner similar to that described with reference to the device 25. In the event of a severe deceleration causing forward movement of the passengers in spite of the restraint of the bar 41 and harness 52, 53, 54, the bar is moved forwardly, causing the arms 42, 43 to be swung towards an upright position, thereby raising the frame 44 upwardly. The raising of the frame presents the barrier 47 across the compartment and above the top of the backrest 45. This barrier prevents the passengers from being thrown into the front seat area of the compartment.

Figure 9:
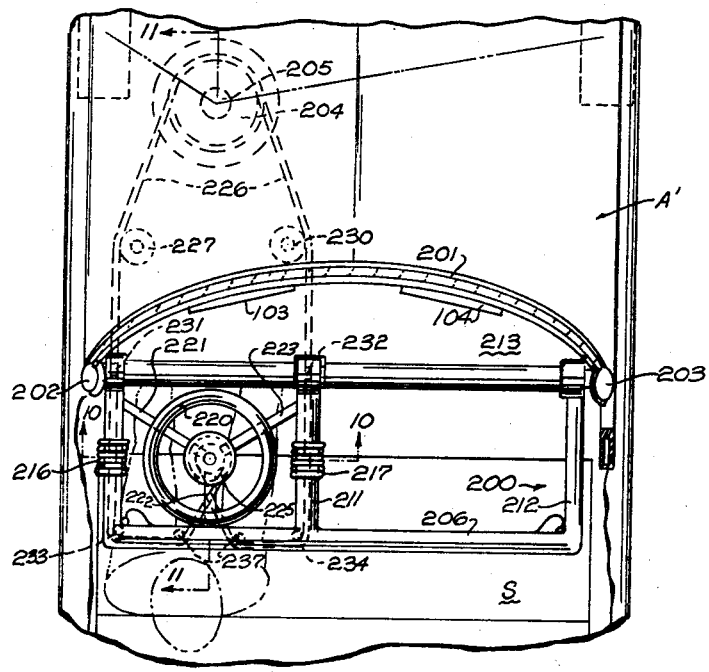
FIG. 9 is a fragmentary schematic plan view of a vehicle similar to that shown in FIG. 1 equipped with a safety device embodying another form of the invention.
Figure 10:
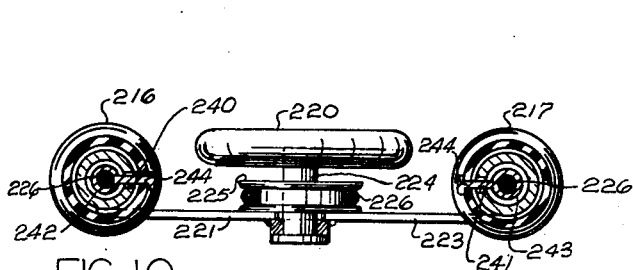
FIG. 10 is a sectional view taken substantially along line 10—10 of FIG. 9.
Figure 11:
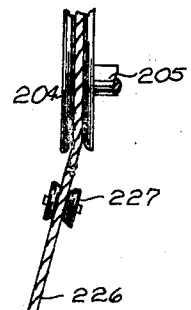
FIG. 11 is a schematic view taken substantially along line 11—11 of FIG. 9 and turned 90°.
Figure 8:
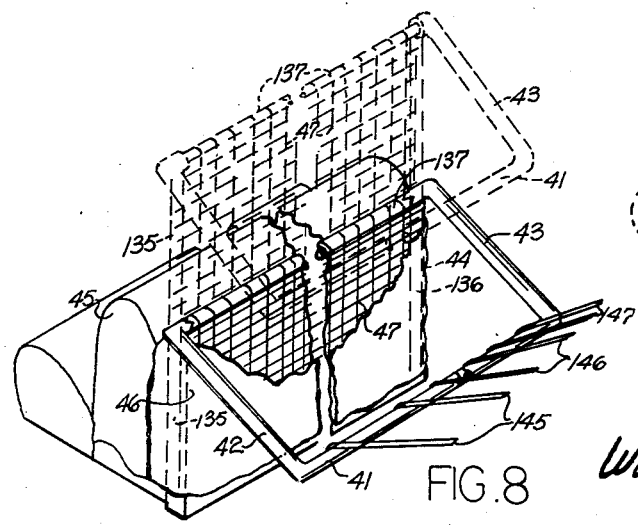
FIG. 8 is a fragmentary perspective view of a portion of the vehicle and the safety device for the occupants in the rear seat of the vehicle.

Another form of the invention is shown in FIGS. 9, 10, 11 wherein a passenger safety device 200 is shown installed in an automobile A'. The automobile A' is of conventional construction with the exception of the steering mechanism, and includes an enclosed passenger compartment having a passenger seat S, a windshield 201, which is positioned between corner posts 202, 203. The steering mechanism for the automobile A' comprises a flanged steering gear wheel 204 which is attached to a shank 205 forwardly of the compartment and which corresponds to the shaft on which the steering wheel of a conventional automobile steering mechanism would be attached. The wheel 204 is adapted to be rotated for steering the automobile A' through steering mechanisms supported on passenger restraining structure which includes a bar 206 attached to arms 210, 212 pivotally carried on a base structure 213 which is like the base structure 33. The bar 206 and the arms 210, 211 are tubular or hollow with the interiors of the arms in open communication with the interior of the bar.

The base 213 is located on the cowl of the automobile and is clamped between the corner posts 202, 203 in the same manner as the base 33 is clamped between the posts 15, 16 and for simplicity, the details are not described. Suffice to say, the bar 206 is adapted to be yieldingly retained in raised and lowered positions to permit entrance and exit of passengers by detent means, not shown, but which may be like the detent means including the element 73, 74, etc. Likewise, the bar 206 is adapted to be secured in its lowered position by hold-down straps which are similar to the straps 37, 38. Also, for the sake of clarity, no body harnesses like 34, 35, 36 are shown, although it is contemplated that such harnesses would be used.

With the bar 206 in the lowered position just described, the bar extends across the compartment and adjacent the mid-sections of the occupant or occupants of the seat. The arms 210, 211 will be approximately opposite the sides of the driver of the automobile and the forearms of the driver may be comfortably rested on these bar carrying arms.

The driver may steer the automobile either by grasping and moving a pair of hand grip members 216, 217 in opposite directions along the arms 210, 211, or he may steer the automobile by rotating a flat steering wheel 220 which is suspended between the arms 210, 211 by bracket members 221, 222, 223. The outer ends of the bracket members 221, 222, 223 are welded or otherwise attached to the arm 210, bar 206 and arm 211, respectively, and the inner ends are suitably joined to and support a spindle 224. The wheel 220 is attached to the upper end of the spindle 224, and a pulley 225 is attached to the spindle beneath the wheel.

The steering gear wheel 204 is rotated by an endless cable 226 connected to the steering mechanisms on the arms 210, 211 and bar 206. The cable 126 is reeved about the flanged periphery of the wheel and is lead into the pivoted open ends of the arms 210, 211 by guide pulleys 227, 230, 231, 232. The cable 126 is guided from the respective arms 210, 211 into the bar 206 by pulleys 233, 234 and then through a slot 35 in the inner side of the bar by pulleys 236, 237 inside the bar and adjacent the ends of the slot. The cable extending from the slot 235 encircles the pulley 225 and is moved in one direction or the other according to the rotation of the steering wheel 220. It is apparent that the cable 226 rotates the steering gear wheel 204 in correspondence with rotation of the steering wheel 220. In addition, the bar 206 and its supporting arms can be swung to and from its passenger restraining position without interference from the cable 226.

The cable 226 also rotates the steering gear wheel 204 according to the movements of the hand grip members 216, 217 along the arms 210, 211. The members 216, 217 each comprises a tubular member which surrounds the respective arms 210, 211 and has corrugated outer grip surfaces. The arms 210, 211 are slotted along the inner sides as seen at 240, 241, and cable grip elements 242, 243 are attached to the cable 226 inside the respective arms 210, 211. The grip elements 242, 243 each has a projection 244, which extends through the respective slots 240, 241 and is attached to the inner side walls of the hand grip members 216, 217. The hand grip members 216, 217 are attached to the cable 226 at positions along the cable so that when these members are directly opposite one another on the arms 210, 211, the wheel 204 is set for steering the automobile straight. By sliding the grip members 216, 217 in opposite directions along the arms 210, 211, the wheel 204 will be correspondingly rotated to steer the automobile in one direction or the other. If desired, a sprocket chain drive or other suitable device could be substituted for the cable drive shown.

It will be understood that the safety device 200 serves to restain occupants of the front seat from being thrown forwardly from the seat in the same manner as described relative to the device 25 and further provides means for steering the automobile which eliminates the hazard of a conventional steering wheel post. The steering wheel 220 is preferably flat and is supported between the arms 210, 211 so that it will offer a safe restraining means for the upper part of the driver's body should the driver be thrown forwardly. Furthermore, the steering arrangement provides a restful support for the driver's arms thereby reducing fatigue and furnishing additional comfort to the driver.

It will be seen that my invention provides a new and improved safety device for preventing or minimizing injury to the occupants of an automobile when the automobile is subjected to sudden deceleration by providing initial restraint to each occupant by a restraining bar and, if desired, by a body harness. In the event of extreme deceleration, the device establishes a barrier across the windshield opening to prevent passengers from being thrown through the windshield and from the automobile. The safety device of the invention is conveniently operated to provide mid-section and body restraint to all occupants of an automobile seat by manipulation of the device by one of the seat occupants. The device is adapted to assure its usage by interferring with steering of the automobile when the device is in a non-effective position. Furthermore, any alternation of the device to cause it to be ineffective to interfere with operation of the vehicle can be readily determined by a casual viewing of the device, thereby facilitating policing of its use. The device further affords a support for steering means which eliminates the usual dangerous steering wheel post which may produce serious injury to an occupant thrown forwardly thereagainst.

Although several forms of the invention have been shown and described, it will be understood that other forms, modifications and adaptations could be made. For example, in its simplest form, my safety device for the front seat may consist merely of a rectangular frame of tubular members which can be positioned between an occupant or occupants of the front seat and the windshield with one side member of the frame in the position of the bar 27 shown in FIGS. 1 and 2 and the opposite side member on the cowl and adapted to engage the windshield. One or more other features shown and described could be eliminated such as either or both of the shoulder harnesses, the protective curtain or webbings 47 or 100, the bar hold-down straps, or the steering wheel interlock.

What is claimed is:

1. A safety device for occupants of an automotive vehicle comprising a compartment having a seat, an elongated restraining element adapted to extend across said seat and restrain occupants of said seat from being thrown forwardly of the seat, means for shifting said element from an occupant restraining position adjacent said seat to a non-restraining position above the level of said seat to permit seating and unseating of occupants, a flexible elongated body restraining harness member having one end attached to said restraining element, and means for attaching the other end of said harness member to a part of the vehicle and rearwardly of an occupant of said seat so that movement of said restraining element to its occupant restraining position shifts said harness member into a position to restrain forward movement of the occupant.

2. A safety device of the character defined in claim 1 further characterized by said other end of said harness member being attached to the vehicle above said seat.

3. A safety device of the character defined in claim 1 in which said means for attaching said other end of said harness member to said compartment includes a means to permit yielding movement of said harness member longitudinally.

4. A safety device for occupants of vehicles which include a compartment having a windshield between forward corner posts and a seat rearwardly of the windshield, said device comprising an elongated restraining element, arms adapted to support said element in a position extending transversely of the compartment and forwardly of the midsections of occupants on said seat, a base structure between said posts and supporting said arms, said base structure including a part adapted to engage a portion of said windshield, means yieldingly attaching said base structure to said posts, and means for directing said arms in an upward direction during movement of said element forwardly whereby said base structure is raised upwardly by said arms and said part of said base member is adapted to force said windshield forwardly.

5. A vehicle including a body provided with a personnel compartment having a windshield at its forward end and a seat spaced rearwardly of the windshield, a personnel restraining structure for resisting forward movement of an occupant of the seat interposable between said windshield and an occupant of said seat with the forward part thereof adjacent to the windshield and the rear part thereof adapted to extend across the front of the seat occupant, means for movably attaching opposite sides of the forward part of said structure to said body, and means actuated by forward movement of said structure for erecting a barrier at the forward part of the personnel compartment.

6. A safety device for a seated occupant of an automotive vehicle comprising a compartment having a seat, a restraining element adapted to extend across the seat and restrain an occupant of the seat from being thrown forwardly of the seat movable from an occupant restraining position adjacent the seat and in front of the mid-section of an occupant of the seat to a nonrestraining position above the level of the seat to permit seating and unseating of an occupant, a flexible restraining member attached to said restraining element, means for attaching said flexible restraining member to a part of the vehicle rearwardly of an occupant of the seat so that movement of said restraining element to occupant restraining position moves said flexible restraining member into a position to restrain forward movement of the upper section of the seat occupant, and means for detachably connecting said restraining element to a part of the vehicle below the top of the seat and to the rear of the front of the seat.

7. A safety device of the character defined in claim 6 in which the means for attaching said restraining element to a part of the vehicle is yieldable.

8. A safety device for a seated occupant of an automotive vehicle comprising a compartment having a seat, a restraining element adapted to extend across the seat and restrain an occupant of the seat from being thrown forwardly of the seat movable from an occupant restraining position adjacent the seat and in front of the mid-section of an occupant of the seat to a nonrestraining position above the level of the seat to permit seating and unseating of an occupant, a flexible restraining member attached to said restraining element, means for attaching said flexible restraining member to a part of the vehicle rearwardly of an occupant of the seat so that movement of said restraining element to occupant restraining position moves said flexible restraining member into a position to restrain forward movement of the upper section of the seat occupant, and means connected to said restraining element movable thereby to form a barrier to further restrain an occupant tending to move forwardly from the seat.

9. A safety device of the character defined in claim 8 in which said means forming said barrier is a web-like member connected to said restraining element.

10. A safety device for a seated occupant of an automotive vehicle comprising a compartment having front and rear seats, a restraining element adapted to extend across the rear seat and restrain an occupant of the seat from being thrown forwardly of the seat movable from an occupant restraining position adjacent the seat and in front of the mid-section of an occupant of the seat to a nonrestraining position above the level of the seat to permit seating and unseating of an occupant, a flexible member attached to said restraining element, means for attaching said flexible restraining member to a part of the vehicle rearwardly of an occupant of the seat so that movement of said restraining element to occupant restraining position moves said flexible restraining member into a position to restrain forward movement of the upper section of the seat occupant, and means for connecting said restraining element to the back of the forward seat for oscillatory movement between occupant nonrestraining position and an occupant restraining position.

11. A safety device of the character defined in claim 10 in which the means for connecting said restraining element to the back of the forward seat includes a member for insertion in a pocket in the back of the forward seat.

12. A safety device for a seated occupant of an automotive vehicle comprising a compartment having a seat, a restraining element adapted to extend across the seat and restrain an occupant of the seat from being thrown forwardly of the seat movable from an occupant restraining position adjacent the seat and in front of the mid-section of an occupant of the seat to a nonrestraining position above the level of the seat to permit seating and unseating of an occupant, a flexible restraining member attached to said restraining element, means for attaching said flexible restraining member to a part of the vehicle rearwardly of an occupant of the seat so that movement of said restraining element to occupant restraining position moves said flexible restraining member into a position to restrain forward movement of the upper section of the seat occupant, and means for supporting said restraining element forwardly of the seat for pivotal movement about an axis extending transversely of the vehicle.

13. A safety device of the character defined in claim 12 in which the means for supporting said restraining element forwardly of the seat includes means for connection to the vehicle.

14. In a vehicle a body provided with a personnel compartment having a windshield at its front end, a seat rearwardly of the windshield, a passenger safety device for restraining forward movement of an occupant of said seat upon rapid deceleration of the vehicle including an occupant restraining element, means supporting the forward part of said restraining element adjacent to the lower edge of said windshield with the rearward part of said restraining element movable from an occupant restraining position adjacent said seat and extending in front of the mid-section of an occupant of said seat to a non-restraining position above said seat to permit seating and unseating of an occupant, a flexible occupant restraining member attached to the rearward part of said restraining element, and means connecting said flexible restraining member to a part of the vehicle above and rearwardly of an occupant of said seat so that movement of said restraining element to an occupant restraining position moves said flexible restraining member into a position to restrain forward movement of the upper section of the seat occupant.

15. A vehicle of the character defined in claim 14 including means for detachable connecting the rear part of said restraining element to the vehicle below the top and to the rear of the front of the seat.

16. In a vehicle a body provided with a personnel compartment having a windshield at its front end, a seat rearwardly of the windshield, a passenger safety device for restraining forward movement of an occupant of said seat upon rapid deceleration of the vehicle including an occupant restraining element, and means supporting the forward part of said restraining element adjacent to the lower edge of said windshield so that upon forward movement thereof by an occupant of said seat with sufficient force it will eject said windshield from its mounting, the rearward part of said restraining element being movable from an occupant restraining position adjacent said seat and extending in front of the mid-section of an occupant of said seat to a nonrestraining position above said seat to permit seating and unseating of an occupant, a flexible occupant restraining member attached to the rearward part of said restraining element, and means connecting said flexible restraining member to a part of the vehicle above and rearwardly of an occupant of said seat so that movement of said restraining element to an occupant restraining position moves said flexible restraining member into a position to restrain forward movement of the upper section of the seat occupant.

17. In a vehicle a body provided with a personnel compartment having a windshield at its front end, a seat rearwardly of the windshield, a passenger safety device for restraining forward movement of an occupant of said seat upon rapid deceleration of the vehicle including an occupant restraining element, and means supporting the forward part of said restraining element adjacent to the lower edge of said windshield so that upon forward movement thereof by an occupant of said seat with sufficient force it will eject said windshield from its mounting, the rearward part of said restraining element being movable from an occupant restraining position adjacent said seat and extending in front of the mid-section of an occupant of said seat to a nonrestraining position above said seat to permit seating and unseating of an occupant.

18. A vehicle of the character defined in claim 17 in which said means supporting the forward part of said restraining element includes a yieldable attachment to the vehicle.

19. A safety device for a seated occupant of an automotive vehicle comprising a compartment having a seat, a restraining element adapted to extend across the seat and restrain an occupant of the seat from being thrown forwardly of the seat movable from an occupant restraining position adjacent the seat and in front of the mid-section of an occupant of the seat to a nonrestraining position above the level of the seat to permit seating and unseating of an occupant, and a web-like member connected to said restraining element movable thereby to form a barrier to further restrain an occupant tending to move forwardly from the seat.

References Cited

UNITED STATES PATENTS

| | | | |
|---|---|---|---|
| 2,755,125 | 7/1956 | Hodges | 280—150 X |
| 2,919,140 | 12/1959 | West | 280—150 |
| 2,923,559 | 2/1960 | Owens | 280—150 |
| 3,081,127 | 3/1963 | Orowan | 280—150 |
| 3,105,702 | 10/1963 | Larson | 280—150 |

KENNETH H. BETTS, Primary Examiner

U.S. Cl. X.R.

296—84; 297—390